(12) United States Patent
Bastide et al.

(10) Patent No.: US 9,940,370 B2
(45) Date of Patent: *Apr. 10, 2018

(54) CORPUS AUGMENTATION SYSTEM

(71) Applicant: International Business Machines Corporation, Armonk, NY (US)

(72) Inventors: Paul R. Bastide, Boxford, MA (US); Matthew E. Broomhall, Goffstown, NH (US); Aaron M. Cohen, Westford, MA (US); Christopher W. Desforges, New York, NY (US); Carl J. Kraenzel, Boston, MA (US); Robert E. Loredo, N. Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 622 days.

This patent is subject to a terminal disclaimer.

(21) Appl. No.: 14/588,719

(22) Filed: Jan. 2, 2015

(65) Prior Publication Data

US 2016/0196312 A1 Jul. 7, 2016

(51) Int. Cl.
*G06F 17/30* (2006.01)
*G06F 17/27* (2006.01)

(52) U.S. Cl.
CPC .... *G06F 17/30539* (2013.01); *G06F 17/2705* (2013.01); *G06F 17/2785* (2013.01); *G06F 17/30377* (2013.01); *G06F 17/30654* (2013.01); *G06F 17/30684* (2013.01)

(58) Field of Classification Search
None
See application file for complete search history.

(56) References Cited

U.S. PATENT DOCUMENTS

| | | | |
|---|---|---|---|
| 5,519,608 A * | 5/1996 | Kupiec | G06F 17/3064 704/9 |
| 8,666,730 B2 | 3/2014 | Todhunter et al. | |
| 8,738,362 B2 | 5/2014 | Ferrucci et al. | |
| 2013/0013546 A1 | 1/2013 | Bagchi et al. | |
| 2013/0018909 A1* | 1/2013 | Dicker | G06Q 10/10 707/758 |
| 2014/0280371 A1 | 9/2014 | Bastide et al. | |
| 2015/0074825 A1* | 3/2015 | Blake | G06F 21/6245 726/28 |
| 2016/0034585 A1* | 2/2016 | Rokhlenko | G06Q 30/02 707/728 |

OTHER PUBLICATIONS

List of IBM Patents or Applications Treated as Related, Dated: Apr. 5, 2016.

(Continued)

*Primary Examiner* — Alexander Khong
(74) *Attorney, Agent, or Firm* — Terrile, Cannati, Chambers & Holland, LLP; Michael Rocco Cannatti

(57) ABSTRACT

An approach is provided for automatically ingesting additional corpus based on an interaction history that is mined to identify a question that meets specified answer deficiency criteria, and then generate a second question which is correlated to the first question by requesting additional answer information for answering the first question, where the second question is posted to a forum using a selected persona so that forum responses can be monitored and ingested as additional content in the knowledge base.

13 Claims, 5 Drawing Sheets

(56) References Cited

OTHER PUBLICATIONS

IP.com., Automated Forum Using a Question Answering System, IP.com No. 000237219, dated Jun. 9, 2014.
R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

500

600

CORPUS AUGMENTATION SYSTEM

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). The QA system generates answers from an ingested knowledge base which can come from a variety of sources, including publicly available information and/or proprietary information stored on one or more servers, Internet forums, message boards, or other online discussion sites where people can hold conversations in the form of posted messages. Using the ingested information, the QA system can formulate answers using a natural language process to provide answers with associated evidence and confidence measures. However, the quality of the answer depends on the information contained in the knowledge base corpus, so it is possible that not all responses will have high confidence measures, and some may not even have the right answers due to insufficient content or nonexistent content in the knowledge base corpus. With traditional QA systems, there is no mechanism in place to understand if the ingested corpus has the relevant content when the QA system responds with very low confidence answer or cannot find the right answers. Nor are traditional QA systems able to identify and ingest new content based on user interactions to provide a good overall experience except through use of a laborious manual processes whereby a domain expert reviews and selects documents for ingestion into a corpus. Attempts to automate the ingestion of new information into the corpus, such as by using a machine or bot to post to a forum, have proven difficult due to misconceptions as to the purpose of the forum, concerns about the presence of a bot on the forum, and/or perceptions that the posts are part of an Astroturfing operation. As a result, the existing solutions for efficiently identifying and ingesting content into a corpus are extremely difficult at a practical level.

SUMMARY

Broadly speaking, selected embodiments of the present disclosure provide a system, method, and apparatus for processing of inquiries to an information handling system capable of answering questions by using the cognitive power of the information handling system to add content for ingestion into the knowledge base corpus by generating forum questions relating to low quality forum topics and posting the forum questions to one or more forums using a forum persona that is generated based on user interactions with the forum and information extracted therefrom. In selected embodiments, the information handling system may be embodied as a question answering (QA) system which receives and answers one or more questions from one or more users. To answer a question, the QA system has access to structured, semi-structured, and/or unstructured content contained or stored in one or more large knowledge databases (a.k.a., "corpus"). To improve the quality of answers provided by the QA system, a corpus augmentation engine is periodically or manually triggered to process user interactions (e.g., forum posts) at one or more specified forums to extract question format information from the forum posts and to construct therefrom one or more question templates for each forum. In addition, the corpus augmentation engine may be configured to extract user context information (e.g., user ID, user group, user name, age, gender, date, time, location, originating device type, name, or IP address) associated with users of the forum and to construct therefrom one or more forum persona for each forum. On a predetermined basis, the corpus augmentation engine also processes user interactions (e.g., forum posts) associated with low confidence or low quality answers to identify forum questions or topics having statistical insignificance or low amounts of evidence. In selected embodiments, the corpus augmentation engine mines forum postings to identify low confidence/quality questions or answers that meet specified answer deficiency criteria (e.g., low confidence, no answer, negative sentiment, repeated questions, absence of evidence, etc.). Once a low confidence/quality question or topic is identified, the corpus augmentation engine may generate a forum question corresponding to the low quality forum question/topic using extracted key words to populate a predefined question template. Under control of the corpus augmentation engine, the forum question may be associated with a selected forum persona, such as a default or primed persona, curated persona, automated persona, or user-selected persona. Using the selected forum persona, the forum question is posted to a selected forum to elicit one or more responses from other forum users. Any received responses may be evaluated by the corpus augmentation engine for possible ingestion into the knowledge base corpus.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention my be better understood, and its numerous objects, features, and advantages made apparent to those skilled in the art by referencing the accompanying drawings, wherein.

DETAILED DESCRIPTION

Figure 1:
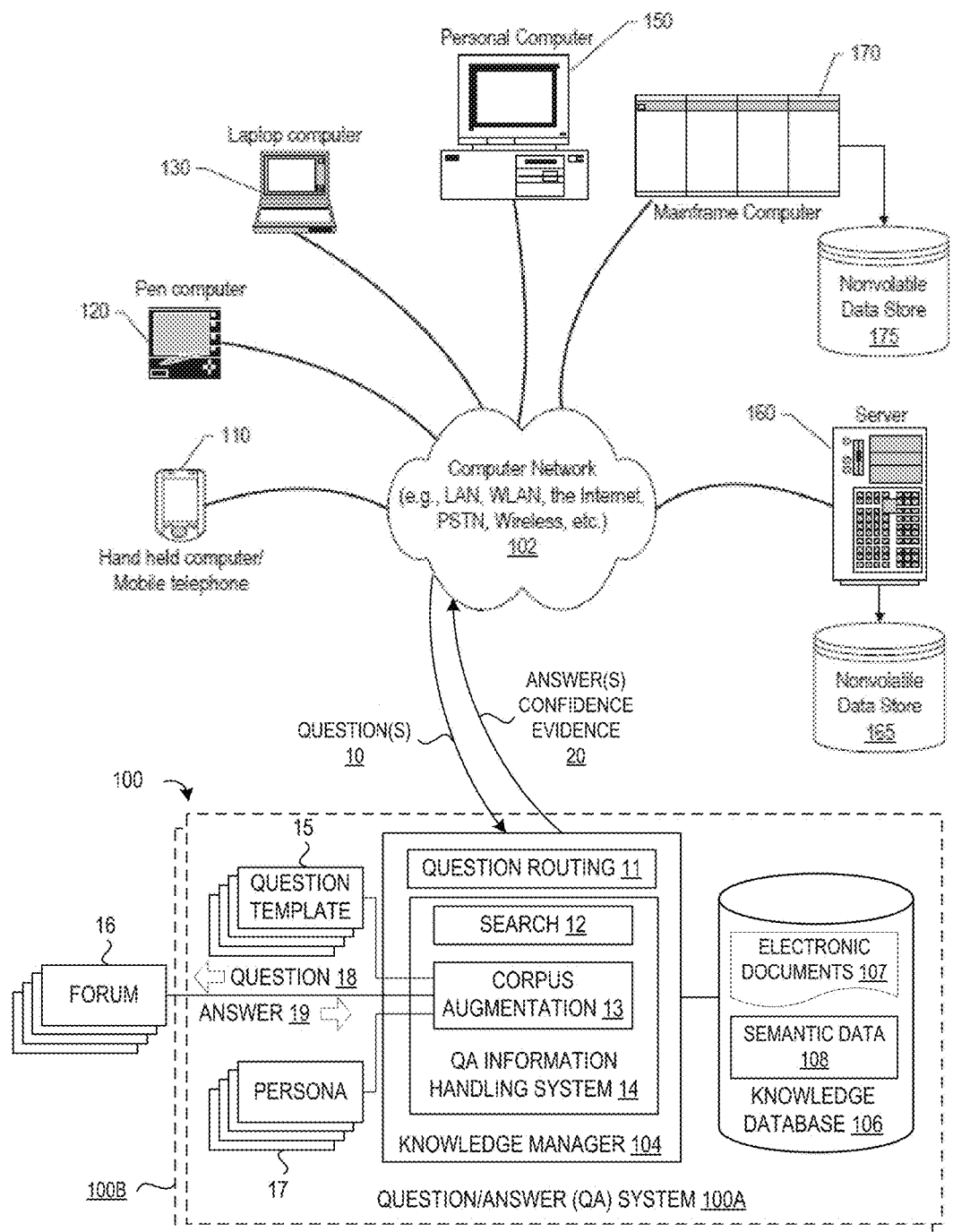
FIG. 1 depicts a network environment that includes a knowledge manager that uses a knowledge base and a corpus augmentation engine for adding content to ingest into the knowledge base.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102. The QA system 100 may include one or more QA system pipelines 100A, 100B, each of which includes a knowledge manager computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, sub-systems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 or other data, a content creator 108, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, the content creator creates content in an electronic document 107 for use as part of a corpus of data with knowledge manager 104. Content may also be created and hosted as a document in one or more forums 16, whether stored as part of the knowledge database 106 or separately from the QA system 100A. Wherever stored, the document may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content 108, the process can use a variety of conventions to query it from the knowledge manager. One convention is to send a well-formed question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," developerWorks, 2011 and "The Era of Cognitive Systems: An Inside Look at IBM Watson and How it Works" by Rob High, IBM Redbooks, 2012.

In addition to providing answers to questions, QA system 100 may embody a corpus augmentation engine 13 within the knowledge manager 104 which adds content for ingestion into the knowledge base corpus 106 by generating forum questions relating to low quality forum topics and posting the forum questions to one or more forums using a forum persona that is generated based on user interactions with the forum and information extracted therefrom. To provide meaningful additions to the knowledge base corpus 106, knowledge base corpus 106 may be configured to store the interaction history of questions and answers 10, 20, alone or in combination with extracted user profile, timing, and location information relating to each submitted question. In selected embodiments, the stored interaction history may include variables and context information extracted from the interaction history, such as question terms, user context information (e.g., user ID, user group, user name, age, gender, date, time, location, originating device type, name, or IP address), answer terms, answer confidence measure, supporting evidence for the answer, etc.

To improve the quality of answers provided by the QA system 100, the corpus augmentation engine 13 may be embodied as part of a QA information handling system 14 in the knowledge manager 104, or as a separate information handling system, to execute a corpus augmentation process that processes user interactions (e.g., forum posts) from questions 10 presented to one or more specified forums 16 to extract question format information from the forum posts and to construct therefrom one or more question templates for each forum. As used herein, a forum refers to any computer-assisted platform or site which enables a person or user to post a question and receive a response. Examples of forums include, but are not limited to public and private forums, such as IBM Connections Forums, Quora, Yahoo Answers, and StackOverflow, as well as any online social network, such as IBM Connections Profiles/Updates, LinkedIn, Facebook, Google+, YouTube, histogram, Pinterest, Vine, Tumblr, and Twitter.

To initiate processing, each received question 10 may first be routed through an intelligent question routing process 11 which directs the question 10 to the correct processing function or module within the knowledge manager 104. For example, the intelligent question routing process 11 may use an extraction process, such as a semantic analysis tool or automatic authorship profiling tool, to extract the structure and semantics from the question text, such as user profile, timing, location, emotional content, authorship profile, and/or message perception. The question routing process 11 may also use natural language (NL) processing to analyze textual information in the question and retrieved information from the knowledge database 106 in order to extract or deduce question context information related thereto, and to determine if the submitted question or topic has sufficient supporting content and training in the knowledge database 106. In addition or in the alternative, the intelligent question routing process 11 may also account for user status in terms of access entitlements to the QA system 100 or other internal routing considerations or factors.

If the intelligent question routing process 11 determines that the received question 10 is understood and is directed to a topic having sufficient supporting content and training, the received question 10 may be directed to the search processing function or module 12 which may use NL processing to analyze textual information in the question and retrieved responsive information from the knowledge database 106. For example, the search processing function or module 12 may process the question 10 to extract or deduce question context information related thereto, such as end user location information, end user profile information, time of day, lexical answer type (LAT) information, focus, sentiment, synonyms, and/or other specified terms. Using the extracted question context information, the search processing function or module 12 may use a Natural Language Processing (NLP) routine to identify responsive answer information in the corpora 106, where "NLP" refers to the field of computer science, artificial intelligence, and linguistics concerned with the interactions between computers and human (natural) languages. In this context, NLP is related to the area of human-to-computer interaction and natural language understanding by computer systems that enable computer systems to derive meaning from human or natural language input.

If, however, the intelligent question routing process 11 determines that the received question 10 is not understood and/or is directed to a topic having insufficient supporting content and training, the received question 10 may be directed to the corpus augmentation processing function or module 13 which may use NL processing to process user interactions (e.g., forum posts) at one or more specified forums 16 as an additional information source. To this end, the corpus augmentation processing function/module 13 may be configured to access one or more forums 16 and extract therefrom question format information from the forum posts which is used to construct one or more question templates 15 for each forum. In addition, the corpus augmentation processing function/module 13 may be configured to extract user context information (e.g., user ID, user group, user name, age, gender, date, time, location, originating device type, name, or IP address) associated with users of the forum 16 which is used to construct one or more forum persona 17 for each forum. To improve the quality of answers provided by the QA system 100, the corpus augmentation processing function/module 13 may be periodically or manually triggered to process user interactions (e.g., forum posts) associated with low confidence or low quality answers. For example, the corpus augmentation processing function/module 13 may be configured to mine forum postings 16 to identify low confidence/quality questions or answers that meet specified answer deficiency criteria (e.g., low confidence, no answer, negative sentiment, repeated questions, absence of evidence, etc.) and/or to identify forum questions or topics having statistical insignificance or low amounts of evidence. Once a low confidence/quality question or topic is identified, the corpus augmentation processing function/module 13 may generate a forum question corresponding to the low quality forum question/topic by extracting key words to populate a predefined question template 15, such as by using an extraction process, such as a semantic analysis tool, to extract specified structure and semantics from the low confidence/quality question or topic for insertion into the predefined question template 15. In addition, the corpus augmentation processing function/module 13 associates the forum question with a selected forum persona 17 which is used to submit or post the forum question 18 to a selected forum 16 to elicit one or more responses or answers 19 from other forum users. Any received responses may be evaluated by the corpus augmentation processing function/module 13 for possible ingestion into the knowledge base corpus 106 or otherwise posting back to the forum 16.

Types of information handling systems that can use the QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
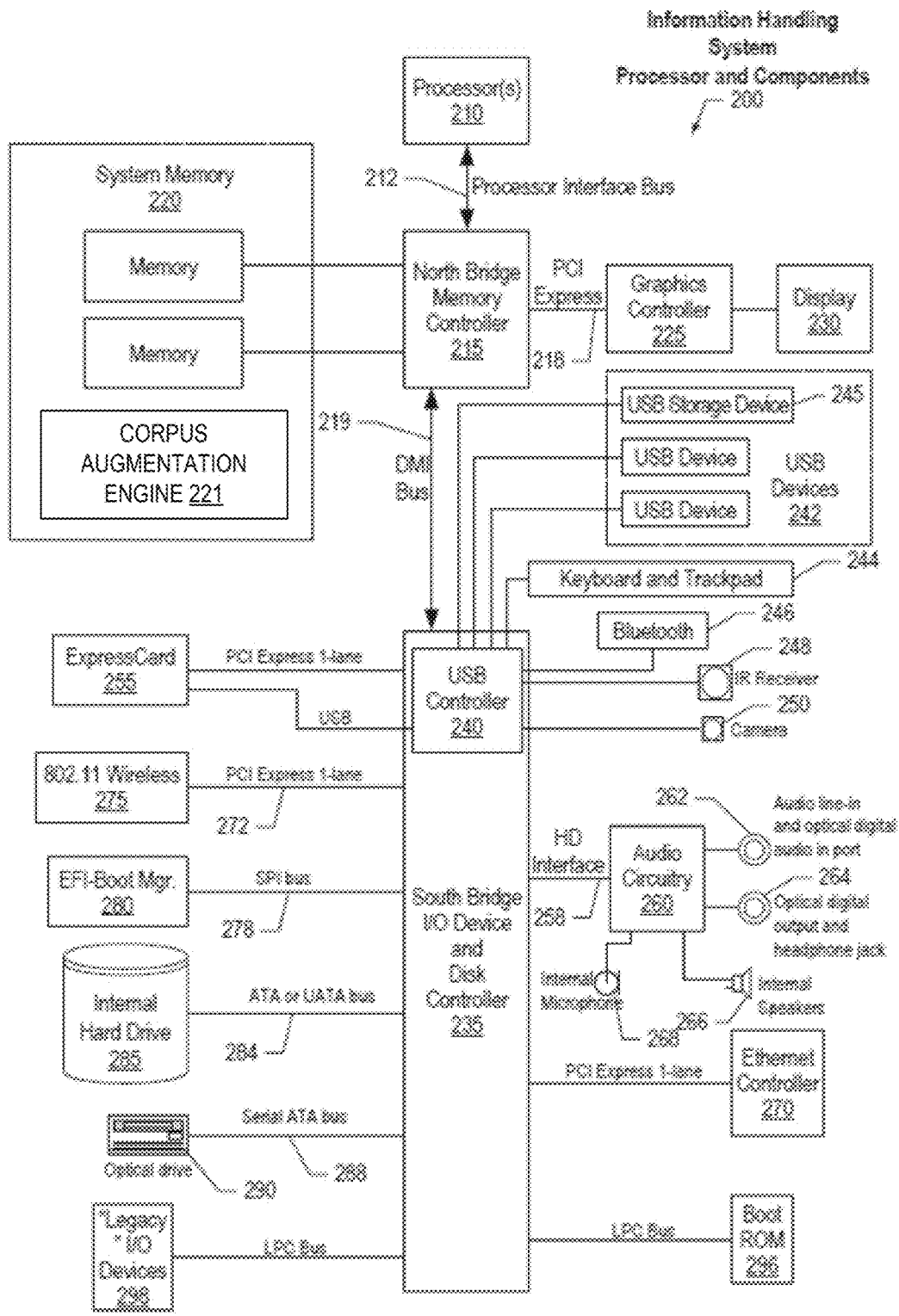
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a corpus augmentation engine module 221 which may be invoked to process user interactions to add content for ingestion into the knowledge base corpus by generating forum questions relating to low quality forum topics and posting the forum questions to one or more forums using a forum persona that is generated based on user interactions with the forum and information extracted therefrom. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boat ROM 296 and "legacy" I/O devices (using a "super I/O" chip), The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
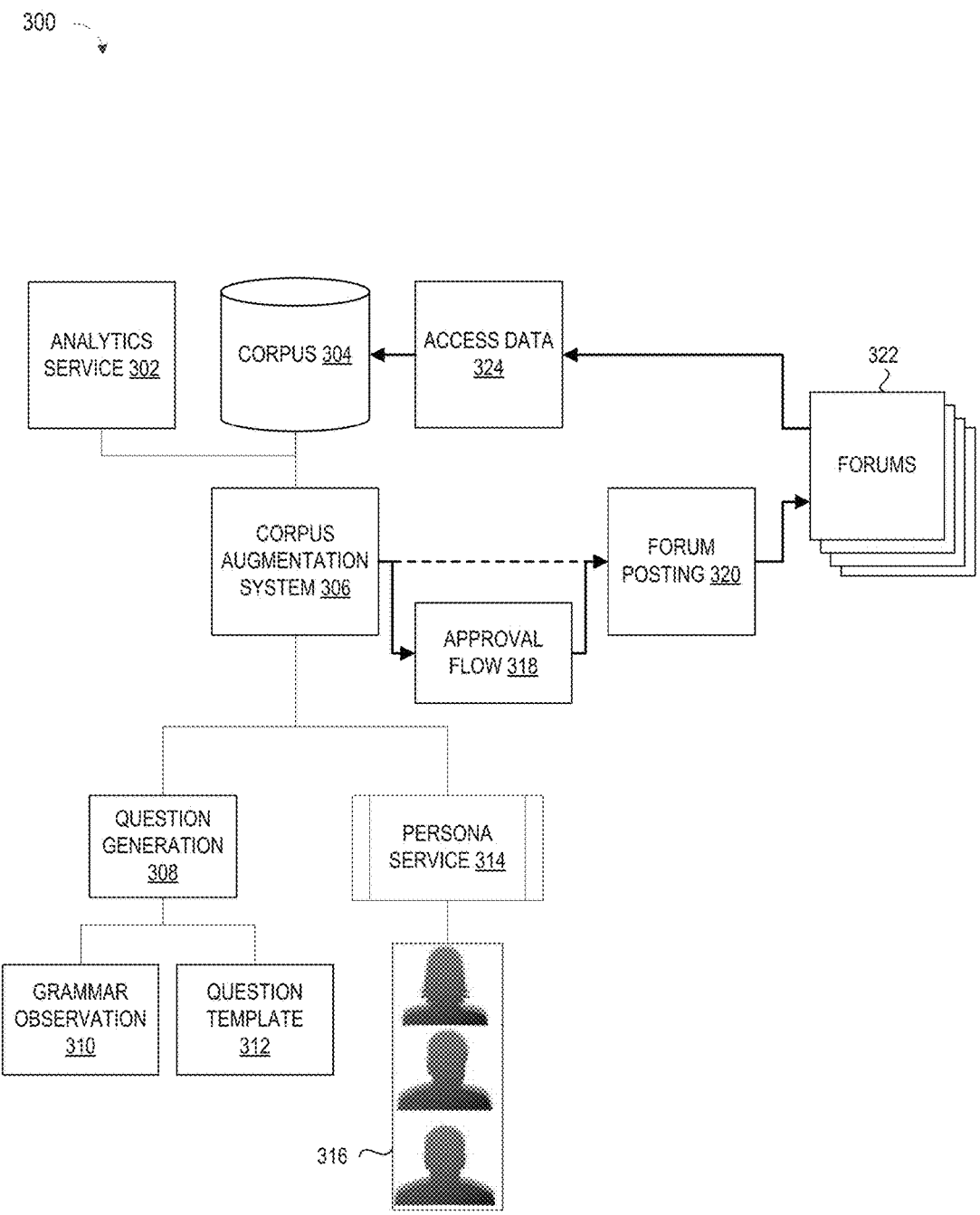
FIG. 3 is a component block diagram illustrating an example architecture of a corpus augmentation system.

To provide additional details for an improved understanding of selected embodiments of the present disclosure, reference is now made to FIG. 3 which depicts a component diagram 300 of various system components of an example architecture for a corpus augmentation system for obtaining answers to low quality forum questions by posting new forum questions to a selected forum using generated persona and question templates extracted from the selected forum. The system components shown in FIG. 3 may be used to augment or add to the content stored in the knowledge corpora 106 that is used to answer a question request (e.g., question 10) presented for processing to a cognitive system 100, such as an IBM Watson™ QA system or other natural language question answering system shown in FIG. 1.

In selected embodiments, the system component diagram 300 may be executed on an information handling system to add new content for ingestion into the knowledge base corpus by generating forum questions relating to low quality forum topics and posting the forum questions to one or more forums using forum persona and question template information that is extracted from user interactions presented to a knowledge management system, such as QA system 100 shown in FIG. 1, thereby eliciting forum responses for ingestion in the knowledge base corpus 106. This approach can be included within the QA system 100 or provided as a separate corpus augmentation system, method, or module. Wherever implemented, the disclosed corpus augmentation scheme mines low confidence or low quality forum question and answers to extract a plurality of variables and user context information, as well as unstructured and semi-structured documents and text, which are used to generate new forum questions and forum persona tailored for a specific forum.

The depicted system components 300 may include one or more analytics service components 302 which provide the computer program product processing functionality in the form of hardware and/or software as a circuit, module or system to carry out operational aspects of the corpus augmentation system, such as semantic or keyword extraction, natural language processing, text analytics services, regression modeling, format extraction, persona generation, and the like. Connected to the analytics service component(s) 302 is an associated corpus database component 304 for storing information sources for answering submitted questions, where the information sources may include ingested documents, databases, and other structured, semi-structured, and/or unstructured content.

Connected to the analytics service components(s) 302 and corpus database component 304 is a corpus augmentation system component 306 which may be suitably configured to control and manage the corpus augmentation process by detecting or identifying a low quality topic or question in the corpus database component 304 having statistical insignificance or low amounts of evidence and also retrieving documents from the corpus database component 304 which correspond to the low quality topic or question. The corpus augmentation process executed by the corpus augmentation system component 306 also generates a "new" question corresponding to the low quality topic or question which requests information relating to the low evidence topic/question, and selects at least one persona to post the "new" question to one or more identified forums which are then monitored for relevant responses that may be ingested into the corpus database component 304.

To assist with question generation, the corpus augmentation system component 306 may be connected to a question generation component 308 which may be suitably configured to generate "new" questions corresponding to low quality topics or questions. In selected embodiments, a "new" question may be crafted for submission to a specific forum 322 (e.g., the "Software Engineering" forum) by configuring the question generation component 308 to connect to the specified forum and crawl or review its content to identify and analyze the questions which have been posed to the specified forum. Based on the question analysis, the question generation component 308 may employ NLP processing and/or extraction algorithms provided by the analytics service 302 to extract structural information relating to the structure of questions posed to the forum, thereby defining a question template which may be stored for subsequent retrieval and use. Alternatively, the question generation component 308 may employ machine learning model processing provided by the grammar observation component 310 to generate a question template by extracting the grammar structure from the questions posed to the forum and generating a parse tree from the grammar structure, thereby defining a question template which may be stored for subsequent retrieval and use. Alternatively, the question generation component 308 may employ a manual processing provided by the question template component 312 to generate a question template which may be stored for subsequent retrieval and use. A simplified example question template would be {What <VERB><NOUN>} which may subsequently be populated by the question generation component 308 with terms extracted from a low quality topic or question when generating a "new" question related thereto. As will be appreciated, the question generation component 308 may generate compound question templates or complex templates.

To further assist with the submission of new questions to a selected forum, the corpus augmentation system 306 may be connected to a persona service component 314 which may be suitably configured to generate or select a persona (e.g., a "Software Engineer Persona") to be used to submit the "new" question to a selected forum 322. In selected embodiments, any of a number of types of personas may be selected or generated by the persona service component 314, such as a default or primed persona, curated persona, automated persona, or user-selected personal. For example, the persona service component 314 may be configured to connect to the specified forum and crawl or review its content to identify and analyze the typical user attributes for persons participating in the specified forum. Based on the user attribute analysis, the persona service component 314 may employ processing extraction algorithms or machine learning model processing to extract user context information (e.g., user ID, user group, user name, age, gender, date, time, location, originating device type, name, or IP address) associated with users of the forum. After assigning the extracted user context information (e.g., Name Bob, Gender—Male, Age—29, email—name@.us.ibm.com) to a generated persona (e.g., "Software Engineering Persona") along with a randomly generated user image or photo, the persona service component 314 may then register the generated persona, "Software Engineering Persona, with the selected forum 322. As mentioned above, a variety of different types of personas 316 may be selected or generated by the persona service component 314. For example, the personas 316 may include primed or default personal may be generated before the operation of the system using different personas with various levels of expertise (e.g., novice, intermediate, expert). In addition or in the alternative, the personas 316 may include a curated persona that is generated based on experts reviewing the operation of the system who select various features for existing users to generate the curated persona. In addition or in the alternative, the personas 316 may include an automated persona that is automatically generated based on review of the language and/or responsive qualities of one or more forum users, such as the user's frequency of posting, number of posts, number of answers, profile attributes (gender, age, job title), etc. Over time, an automated persona may be generated from a default persona by employing text analytics software with a regression model to track the profiles of forum users as a group and making corresponding changes to the default persona to better follow the tone of the forum discussions. In addition or in the alternative, the personas 316 may include a selected persona which refers to actual forum users who are used to post forum questions through their profile, with or without approval. For example, a selected persona may be a user who volunteers as being willing to post questions through their profile, or may be a user who is conscripted by management (for instance, a support engineer) to post questions through their profile.

To coordinate the presentation of a question to a selected forum 322, the corpus augmentation system component 306 may be configured to associate a question template from the question generation component 308 with a generated persona (e.g., "Bob" the "Software Engineering Persona") from the persona service component 314. The association may be accomplished by storing a generated persona for a selected forum along with one or more question templates that were generated from questions posted on the selected forum, alone or in combination with associated profile data and question template enhancements, such as persona-specific styles, greetings, signature lines, etc.

After associating the question templates with corresponding persona for each forum, the corpus augmentation system component 306 is positioned to generate a forum question for a low quality question or topic by populating the question template with key words or term extracted from the low quality forum question or associated answer. As a preliminary step, the corpus augmentation system component 306 is configured to identify a low quality question or topic. To this end, the corpus augmentation system component 306 may employ a Natural Language Processing (NLP) routine or other analytics tool to process the received questions and scan the corpus database component 304 to determine if there is insufficient evidence to automatically answer the question, or to otherwise determine that there is weak supporting evidence for the question. If the corpus scan identifies supporting evidence or text in the corpus having a confidence measure that is below a minimum threshold (e.g., 80% confidence), the associated question is identified as a low quality question or topic. For example, the corpus augmentation system component 306 may scan the corpus database component 304 for supporting evidence for a question (e.g., "What is it with Latcinia?"), and find supporting evidence (e.g., "Lorem ipsum dolor sit amet, consectetur adipiscing elit. Vestibulum facilisis eros sed risus volutpat, sed consectetur neque semper. Fusce porttitor dolor porttitor nibh rhoncus ultrices. Aliquam erat volutpat. Vestibulum ut ultricies sapien, pellentesque elementum purus. Sed facilisis neque sagittis scelerisque aliquam. Ut lacinia lorem justo, eget lacinia eros viverra nec. Class aptent taciti sociosqu ad litora torquent per conubia nostra, per inceptos himenaeos.") that has a relatively low confident measure (e.g., 73% confidence). This may occur, for example, when the terminology from the question (e.g., "latcinia") does not exactly match terminology (e.g., "lacinia") from the supporting evidence.

With a low quality question or topic and supporting evidence identified, the corpus augmentation system component 306 may be configured to process the supporting evidence with a Natural Language Processing (NLP) routine or suitable extraction process, such as a semantic analysis tool, to extract key terms or text from the supporting evidence for use in formulating a new forum question. For example, the corpus augmentation system component 306 may process the supporting evidence to extract a sentence (e.g., "Ut lacinia lorem justo, eget lacinia eros viverra nec.") based on relevancy to the low quality question (e.g., the extracted sentence includes a term "lacinia" that is similar to the term "latcinia" the question). Using the question generation component 308, the corpus augmentation system component 306 may then generate a "new" forum question by employing an NLP routine, machine learning tool, artificial intelligence, or other linguistics process to convert the extracted sentences to a forum question with a new paragraph form by parsing the contents of the extracted sentence and matching the grammar parts to a specified question template. In this process, the corpus augmentation system component 306 determines that the low quality question or topic (and therefore, the "new" forum question) is related to a specific forum area (e.g., software engineering), and therefore uses a question template which is associated with a generated persona (e.g., "Bob" the "Software Engineering Persona") for that forum area. As will be appreciated, each sentence in the supporting evidence paragraph may be used to automatically create one or more new forum questions which may be spread or submitted to one or more forums using different personas.

To submit a "new" forum question to a selected forum, the corpus augmentation system 306 may be connected to a forum posting component 320 which may be suitably configured to post a forum question (or answer) to the selected forum (e.g., a forum for "Software Engineers") using an associated persona (e.g., "Bob"). In selected embodiments, an approval flow component 318 may be connected as part of the process flow in cases where permission is required from a persona, such as a curated persona or selected persona. However, the forum posting component 320 may be bypassed in cases where permission is not required from a persona.

In response to the new forum question, other users at the selected forum 322 may submit answers or responses which may be used to improve the quality of the answer or evidence for the question. To this end, the corpus augmentation system 306 may be connected to an access data component 322 which may be suitably configured to monitor, evaluate, and ingest responses from the forum which improve the evidence related to the low quality question or topic. As a result, the user responses to the new forum question are automatically retrieved from the selected forum 322, and provided or uploaded to the QA system 100 or other NLP question answering system for ingestion into the corpus database component 304.

Figure 4:
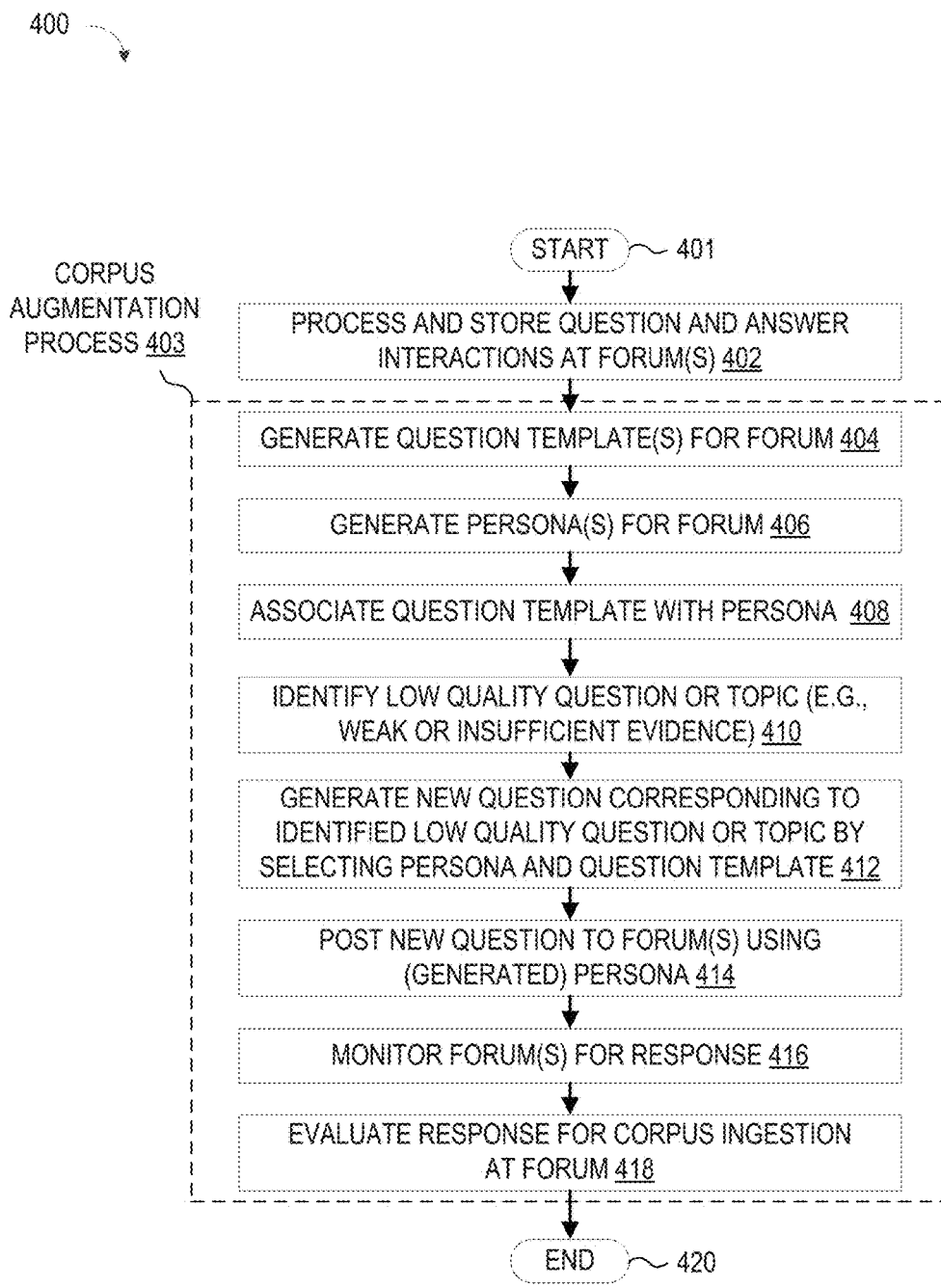
FIG. 4 illustrates a simplified flow chart showing the logic for adding new corpus content by generating forum questions relating to low quality forum topics and posting the forum questions to one or more forums using a forum persona that is generated based on user interactions with the forum and information extracted therefrom.

To provide additional details for an improved understanding of selected embodiments of the present disclosure, reference is now made to FIG. 4 which depicts a simplified flow chart 400 showing the logic for adding new corpus content by generating forum questions relating to low quality forum topics and posting the forum questions to one or more forums using a forum persona that is generated based on user interactions with the forum and information extracted therefrom. The processing shown in FIG. 4 may be performed in whole or in part by a cognitive system, such as the corpus augmentation system 13, QA system 100, or other natural language question answering system which uses generated questions and forum persona to post forum questions for eliciting new structured, semi-structured, and/or unstructured content from forum responses for ingestion into one or more knowledge databases.

FIG. 4 processing commences at 401 whereupon, at step 402, a question or quality from one or more end users is processed to generate an answer with associated evidence and confidence measures for the end user(s), and the resulting question and answer interactions are stored in an interaction history database. The processing at step 402 may be performed at the QA system 100 or other NLP question answering system and applied to questions and answers posted to a forum, though any desired information processing system for posting questions and answers may be used. As described herein, a Natural Language Processing (NLP) routine may be used to process the received questions and/or generate a computed answer with associated evidence and confidence measures. In this context, NLP is related to the area of human-computer interaction and natural language understanding by computer systems that enable computer systems to derive meaning from human or natural language input.

In addition to processing questions to generate answers, the processing at step 402 may also include the extraction of key terms and user context information relating to the question and answer interaction. The context extraction processing at step 402 may be performed at the QA system 100 by an extraction process which uses a multimodal user interface (UI) or application programming interface (API) to process multimodal input questions 10 to effectively transform the different inputs to a shared or common format for context extraction processing on the received questions and/or on any computed answer. At this input stage, the extraction processing at step 402 may be suitably configured to understand or determine profile, location (which can be detected using the GPS on their mobile devices or approximation using IP address), date and time information for each of the end users, type of device used to submit a question, and the interests at the level of event the user is experiencing in a near real-time, thereby generating user context information for each question. For example, the processing at step 402 may apply a semantic analysis tool or automatic authorship profiling tool to obtain user profile information for the end user submitting each question to a forum. In selected example embodiments, the extraction processing at step 402 may generate user context information by leveraging location information of each end user, such as by detecting specific end user location information (e.g., GPS coordinates) based on the end user device capabilities, and/or by detecting approximation-based end user location information (e.g., origination IP address). In other embodiments, the context extraction processing step 402 may identify additional contextual information for each submitted question, such as key terms, focus, lexical answer type (LAT) information, sentiment, synonyms, and/or other specified terms. In addition to extracting context information, the processing at step 402 may capture and store any comments, sentiments, or other feedback provided by an end user in response to the computed answer.

While the QA system 100 or other NLP question answering system processes received questions and provides the set of responses or answers, the question and answer interaction may be logged and stored in an interaction history database along with extracted context attributes and associated comments regarding the quality or usefulness of the generated answer. In selected example embodiments, the stored interaction history database will log and persist predetermined user interaction data, such as question terms, user profile information (e.g., user ID, user group, user name, age, gender, date, time, location, originating device type, name, or IP address), answer terms, answer confidence measure, and supporting evidence for the answer.

To provide the QA system 100 or other NLP question answering system with new content to ingest for purposes of improving the available evidence for answering questions, a corpus augmentation process 403 is activated periodically or on demand to mine the interaction history and offer actionable insights by generating forum questions relating to low quality forum topics and posting the forum questions to one or more forums using a forum persona that is generated based on user interactions with the forum and information extracted therefrom. Once triggered, the corpus augmentation process 403 begins execution against predetermined forum data with a question template generation process 404 which generates one or more question templates for the forum. The processing at step 404 may be performed at the corpus augmentation engine 13 or the QA system 100 by employing NLP processing and/or extraction algorithms, machine learning model processing, and/or manual processing to generate the question templates.

When employing machine learning techniques, the question template generation process 404 may check for existing questions or topics posted by a specified forum profile (e.g., the user "Eve" on the "Software Engineers" forum) or across an entire forum service, forum, or topic thread. As will be appreciated, any desired question identification technique may be used to identify existing questions or topics at step 404, including but not limited to identifying any forum question from the specified user profile having a "marked as question" flag, or scanning the forum postings for the specified user profile for text which concludes with the question mark ("?"). In addition or in the alternative, the question template generation process 404 may check for existing questions or topics by identifying sentences with key question-signaling terms, such as "who," "when," "where," "why," "how." etc. If desired the question template generation process 404 may implement a consensus algorithm to select a valid question.

Figure 5:
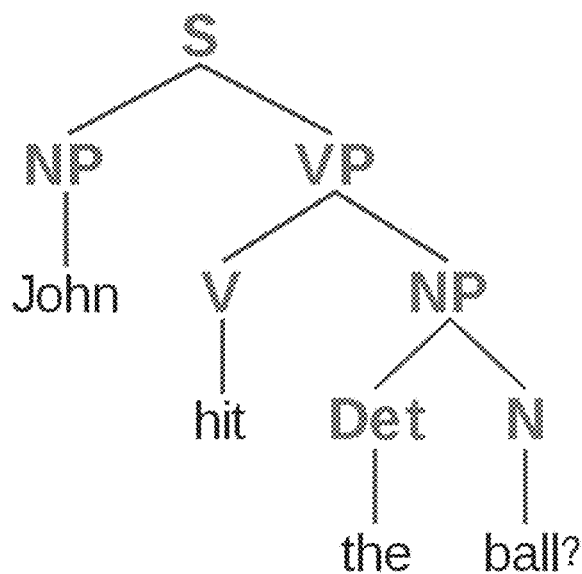
FIG. 5 illustrates a grammar structure parse tree extracted from a forum question.
Figure 6:
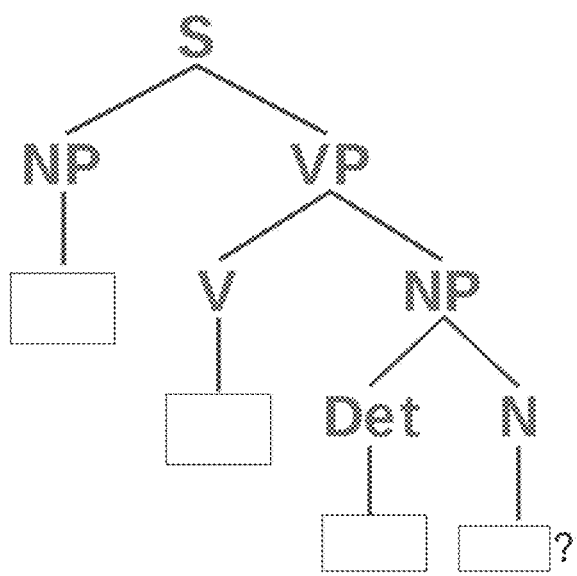
FIG. 6 illustrates a generalized grammar structure for a question template.

Once forum questions are identified, the question template generation process 404 may extract the grammar structure from the identified forum questions to generate a parse tree representation of the question's grammar structure. For example, the question template generation process 404 may employ an NLP routine, machine learning tool, artificial intelligence, or other linguistics process to execute a grammar parsing tool, such as a Cocke-Younger-Kasami parser, to parse the forum question into predetermined grammar parts. To illustrate an example grammar structure parse tree, reference is made to FIG. 5 which shows a parse tree 500 for the question "John hit the ball?" with the sentence (S) is broken down into the constituent structure of the noun phrase (NP), verb phrase (VP), verb (V), determiner (Det), and noun (N). Once the grammar structure parse tree for a question is generated, the question template generation process 404 may extract or remove the actual words (e.g., verbs, nouns, and adjectives) to leave only the generalized grammar structure of the question, thereby defining a question template which may be stored for subsequent retrieval and use. To illustrate an example machine learned question template, reference is made to FIG. 6 which shows a question template 600 derived from the parse tree 500 shown in FIG. 5 having a defined grammar structure of the constituent noun phrase (NP), verb phrase (VP), verb (V), determiner (Det), and noun (N). As will be appreciated, the generated question templates may have any grammar structure, such as "what [VERB] [NOUN]?"

The question template generation process 404 may also employ template-based processing to generate a question template by manually extracting the grammar structure from the questions posed to the forum, and generating a parse tree from the grammar structure, thereby defining a question template which may be stored for subsequent retrieval and use. Whether machine learning or template-based techniques are used, the question template generation process 404 may also insert a link or reference to any associated supporting evidence or documentation associated with the question, thereby providing traceability to the weak evidence/document. To this end, the question template generation process 404 may be configured to automatically populate a "LINK" section with information identifying the supporting evidence associated with the question template.

Before or after the question templates are generated, the corpus augmentation process 403 generates one or more personas with a persona generation process 406. The processing at step 406 may be performed at the corpus augmentation engine 13 or the QA system 100 by employing NLP processing and/or extraction algorithms to generate a persona for a selected forum. For example, the persona generation process 406 may employ an NLP routine, machine learning tool, artificial intelligence, or other linguistics process to execute against predetermined user interaction data or features extracted from at least a first forum persona, and to generate therefrom a persona (e.g., a "Software Engineer Persona") to be used to submit the "new" question to a selected forum. The generated persona may be characterized by extracted user interaction features from a forum persona including, but not limited to, gender, language (L1/L2), age, education level, likes, posts, questions and comments, and other linguistic features. In addition, each forum persona may be characterized by a specific language profile feature (e.g., an "Electronics Expert" persona has a different language profile than a "Lay User" profile). Each persona may further include an associations feature whereby the persona is associated with key posts or "ground-questions" which model the questions. In selected embodiments, the persona generation process 406 may applied to collect user interaction data or features from a collection of forum users (e.g., Bob, Alice, and Doug) who are all software engineers. The persona generation process 406 may store each generated persona with associated key data or features (e.g., Profile—Bob, Title—Software Engineer, Attribute—{soccer-expert, C++}) that may be marked to enable selective or different treatment processing by the corpus augmentation process 403. Depending on the type of persona generated, the persona generation process 406 may also augment or enhance the generated persona with a "Needs Approval" flag requiring approval prior to forum submission.

Once the question templates and personas are generated, the corpus augmentation process 403 uses an association process 408 to associate one or more question templates with each generated persona. The processing at step 408 may be performed at the corpus augmentation engine 13 or the QA system 100 by storing or pairing one or more question templates with an associated persona. For example, the association process 408 may augment or enhance a generated persona with a specified or preferred question style or template, such as, for example, "<PREAMBLE>. How does <NOUN> work?" or "<PREAMBLE>. Is this valid?" The association process 408 may also associate a generated persona with stylistic greeting or closing based on the user interaction features for the persona. For example, an introductory greeting message for a persona having a user profile associated with India may include a greeting message, "I have a doubt" while a closing message for a persona having a user profile associated with United States may include a closing message, "Thank You."

Once the generated persona for a forum is associated with one or more question templates, the corpus augmentation process 403 may identify a low quality question or topic with a question/topic identification process 410 which is applied to identify or extract a deep understanding for one or more question which have weak or insufficient supporting evidence. The processing at step 410 may be performed at the corpus augmentation engine 13 or the QA system 100 by employing NLP processing or machine learning model processes to identify question and answer interactions, such as forum answers, where the statistical confidence measure for the answer(s) is below a minimum threshold. In addition or in the alternative, the question/topic identification processing at step 410 may identify question and answer interactions where user feedback comments or captured sentiments indicate that the answer was not useful, or may identify question and answer interactions for questions that have been repeatedly asked. In addition or in the alternative, the question/topic identification processing at step 410 may identify question and answer interactions in a forum category or topic of which has outliers and/or which is associated with a document in the corpus that has been flagged as needing supporting evidence. As will be appreciated, any desired user interaction data may be used to identify low confidence question and answer interactions at step 410.

Once a low quality question or topic is identified, the corpus augmentation process 403 may generate a new question corresponding to the identified low quality question/topic with a question generation process 412. The processing at step 412 may be performed at the corpus augmentation engine 13 or the QA system 100 by employing NLP processing and/or extraction algorithms to generate a new question for submission to a selected forum. For example, the question generation process 412 may employ an NLP routine, machine learning tool, artificial intelligence, or other linguistics process to retrieve any evidence or documents associated with the low quality question or topic, extract the existing (weak) evidence (e.g., documents or paragraphs) by scanning the textual evidence for the focus areas or areas of importance, and then converting the extracted textual evidence into paragraph form by parsing the contents for insertion into the defined grammar structure of a selected question template. In the course of generating the new question, the processing at step 412 can match the contents, topic, and grammar of the new question with one of the generated persona (from step 406) by selecting the persona on the basis of key features of the existing corpus that are determined to be supported by weak or insufficient evidence. For example, if the new question is directed to the topic of "software engineering," the generated persona "Bob" may be selected since the question relates to "Software Engineering" forum where the "Bob" persona is registered. Once a persona is selected, the processing at step 412 selects a question template associated with the selected "Bob" persona, and then fills out the question template with the extracted textual evidence At step 414, the new forum question is presented or posted to one or more selected forums by the generated persona to elicit a response or answer. The processing at step 414 may be performed at the corpus augmentation engine 13 or the QA system 100 using any desired forum posting mechanism or technique. As a result of the forum question being posted by the generated persona at step 414, other users of the selected forum can respond to with answers to provide additional evidence for use in answering the low quality question or topic. And by properly designing the appearance and profile of the generated user, concerns about interacting with machines or bots on the forum can be avoided.

At step 416, the selected forum is monitored for responses to the new forum question. The processing at step 416 may be performed at the corpus augmentation engine 13 or the QA system 100 using any desired forum monitoring mechanism or technique for accessing the forum to identify responses from other forum users. For example, the forum monitoring process 416 may be configured to automatically crawl the forum and fetch any answer posted in response to the forum question.

At step 418, any received response from the forum is evaluated for possible ingestion into the corpus to the new forum question. The processing at step 416 may be performed at the corpus augmentation engine 13 or the QA system 100 using any desired corpus ingestion mechanism or technique for crawling and fetching a forum response from the forum which is provided or uploaded to the QA system 100 or other NLP question answering system for ingestion. In addition or in the alternative, the process 418 may include presenting new content to a corpus domain expert or forum moderator to review the new content, select the all or part of the new content and referenced supporting evidence or documents for ingestion, and/or choose to ignore one or more new content. After evaluating the response for corpus ingestion at step 418, the process ends at step 420, at which point the corpus augmentation process 403 may await reactivation according to a predetermined or periodic activation schedule.

By now, it will be appreciated that there is disclosed herein a system, method, apparatus, and computer program product for ingesting additional content in a knowledge with an information handling system having a processor and a memory. As disclosed, the system, method, apparatus, and computer program product mine an interaction history which stores a plurality of questions and answer results to identify a first question that meets specified answer deficiency criteria. The mining step may include performing a natural language processing (NLP) analysis of the questions and answer results to identify the first question by detecting an answer for the first question that has a confidence measure below a minimum confidence threshold, by detecting an answer for the first question that provides no response, by detecting an answer for the first question that has an associated negative sentiment, or by detecting an answer for the first question that has no supporting evidence. Once the first question is identified, a second question is generated that is correlated to the first question by requesting additional answer information for answering the first question. In selected embodiments, the second question may be generated by retrieving one or more documents associated with the identified first question, extracting a text sentence from the retrieved document(s) which is correlated to the first question, and then generating the second question by parsing the text sentence to populate a defined question template to construct the second question. In addition, at least one persona (e.g., a primed persona, a curated persona, an automated persona, and a selected persona) is selected to post the second question. After posting the second question to a forum using the selected persona, forum responses to the second question are monitored so that any response may be ingested as additional content in the knowledge base. To facilitate posting of the second question to a selected forum, one or more persona associated with the selected forum may be generated by extracting user profile information from users registered with the selected forum. In addition, one or more question templates associated with the selected forum may be generated by using machine learning processing to identify one or more questions from users registered with the selected forum and extract therefrom one or more question templates.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
one or more processors;
a memory coupled to at least one of the processors; and
a set of instructions stored in the memory and executed by at least one of the processors to ingest additional content in a knowledge base, wherein the set of instructions are executable to perform actions of:
mining, by the system, an interaction history comprising a plurality of questions and answer results to identify a first question by performing a natural language processing (NLP) analysis of the plurality of questions and answer results to detect the first question that meets specified answer deficiency criteria;
generating, by the system, a second question which is correlated to the first question by extracting a text sentence from one or more documents correlated to the first question and parsing the text sentence to populate a defined question template used to construct the second question requesting additional answer information for answering the first question;
selecting, by the system, at least one persona to post the second question;
posting, by the system, the second question to a forum using the at least one persona;

monitoring, by the system, the forum for responses to the second question; and ingesting, by the system, any response to the second question as additional content in the knowledge base.

2. The information handling system of claim 1, wherein the NLP analysis identifies the first question by detecting an answer for the first question that has a confidence measure below a minimum confidence threshold, by detecting an answer for the first question that provides no response, by detecting an answer for the first question that has an associated negative sentiment, or by detecting an answer for the first question that has no supporting evidence.

3. The information handling system of claim 1, wherein generating the second question comprises:

retrieving, by the system, one or more documents associated with the identified first question;

extracting, by the system, a text sentence from the one or more documents which is correlated to the first question; and generating, by the system, the second question by parsing the text sentence to populate a defined question template used to construct the second question.

4. The information handling system claim 1, wherein selecting the at least one persona comprises selecting a persona from a group consisting of a primed persona, a curated persona, an automated persona, and a selected persona.

5. The information handling system claim 1, wherein the at least one persona is registered at the forum where the second question is posted.

6. The information handling system claim 1, further comprising an additional set of instructions stored in the memory and executed by at least one of the processors to perform action of generating, by the system, one or more persona associated with a selected forum by extracting user profile information from users registered with the selected forum.

7. The information handling system claim 1, further comprising an additional set of instructions stored in the memory and executed by at least one of the processors to perform action of generating, by the system, one or more question templates associated with a selected forum by using machine learning processing to identify one or more questions from users registered with the selected forum and extract therefrom one or more question templates.

8. A computer program product stored in a computer readable storage medium, comprising computer instructions that, when executed by an information handling system, causes the system to ingest additional content in a knowledge base by performing actions comprising:

mining, by the system, an interaction history comprising a plurality of questions and answer results to identify a first question by performing a natural language processing (NLP) analysis of the plurality of questions and answer results to detect the first question that meets specified answer deficiency criteria;

generating, by the system, a second question which is correlated to the first question by extracting a text sentence from one or more documents correlated to the first question and parsing the text sentence to populate a defined question template used to construct the second question requesting additional answer information for answering the first question;

selecting, by the system, at least one persona to post the second question;

posting, by the system, the second question to a forum using the at least one persona;

monitoring, by the system, the forum for responses to the second question; and ingesting, by the system, any response to the second question as additional content in the knowledge base.

9. The computer program product of claim 8, wherein mining the interaction history comprises performing, by the system, identifying the first question by detecting an answer for the first question that has a confidence measure below a minimum confidence threshold, by detecting an answer for the first question that provides no response, by detecting an answer for the first question that has an associated negative sentiment, or by detecting an answer for the first question that has no supporting evidence.

10. The computer program product of claim 8, wherein the NLP analysis identifies the first question by detecting an answer for the first question that has a confidence measure below a minimum confidence threshold, by detecting an answer for the first question that provides no response, by detecting an answer for the first question that has an associated negative sentiment, or by detecting an answer for the first question that has no supporting evidence.

11. The computer program product of claim 8, wherein selecting the at least one persona comprises selecting a persona from a group consisting of a primed persona, a curated persona, an automated persona, and a selected persona.

12. The computer program product of claim 8, further comprising computer instructions that are executed to cause the system to generate one or more persona associated with a selected forum by extracting user profile information from users registered with the selected forum.

13. The computer program product of claim 8, further comprising computer instructions that are executed to cause the system to generate one or more question templates associated with a selected forum by using machine learning processing to identify one or more questions from users registered with the selected forum and extract therefrom one or more question templates.

* * * * *